United States Patent [19]
Tyler

[11] Patent Number: 5,183,005
[45] Date of Patent: Feb. 2, 1993

[54] FLIP-FLOP BIRD FEEDER

[76] Inventor: Thomas L. Tyler, 2896 E. 276th St., Atlanta, Ind. 46031

[21] Appl. No.: 849,941

[22] Filed: Mar. 12, 1992

[51] Int. Cl.⁵ ............................................. A01K 39/00
[52] U.S. Cl. ..................................... 119/52.2; 119/54
[58] Field of Search ................... 119/52.1, 52.2, 52.4, 119/54, 55, 56.1

[56] References Cited

U.S. PATENT DOCUMENTS

| | | |
|---|---|---|
| D. 115,321 | 6/1939 | Pueschel . |
| D. 273,429 | 4/1984 | Kilham . |
| D. 299,568 | 1/1989 | Waltemeyer . |
| 996,214 | 6/1911 | Cockrum ............................ 119/52.1 |
| 1,091,392 | 3/1914 | Schlichtinger ................. 119/52.4 X |
| 1,617,988 | 2/1927 | Boyer . |
| 1,840,615 | 1/1932 | Arduser et al. ................ 119/52.1 X |
| 2,475,207 | 7/1949 | Smith ................................. 119/52.2 |
| 2,591,459 | 4/1952 | Meany .............................. 119/52.1 |
| 2,696,803 | 12/1954 | Deffenbaugh . |
| 2,875,729 | 3/1959 | Gibson . |
| 2,987,041 | 6/1961 | Bard . |
| 3,040,705 | 6/1962 | Schlitz . |
| 3,244,150 | 4/1966 | Blair . |
| 4,732,112 | 3/1988 | Fenner et al. . |

Primary Examiner—Gene Mancene
Assistant Examiner—Thomas Price
Attorney, Agent, or Firm—Woodard, Emhardt, Naughton, Moriarty & McNett

[57] ABSTRACT

An improved bird feeder, having a common "Mason" jar to act as a hopper for storing birdseed, a trough for holding seed and to provide a perch for feeding, a cord for suspending the trough and attached jar from a tree, and a support for preventing the inverted and suspended jar from pivoting downward when the feeder is in use. The support is slideably received on the cord, so that the support can be quickly and easily engaged or released from the jar.

4 Claims, 5 Drawing Sheets

FLIP-FLOP BIRD FEEDER

FIELD OF THE INVENTION

This invention relates generally to bird feeders, and more particularly to an improved bird feeder which features a new and unique way of suspending a common household jar and related seed trough so that the jar deposits seed into the trough while in normal operation, yet is easily removed and refilled when necessary.

BACKGROUND OF THE INVENTION

Bird feeders of the prior art are of many different designs and employ a wide variety of materials. For example, some feeders are designed to be permanently mounted on a windowsill or post, while other models are designed to be removeably hung from a bracket or tree. Similarly, some feeders provide only a simple platform to hold the seed, while other models provide sophisticated hopper and trough designs. Wood, metal, glass and plastic all have been effectively used as materials, with some feeders employing common household articles as the basic components of the feeder while other feeders feature components which are entirely custom made.

One useful type of feeder is the suspended hopper and trough type. These feeders include a hopper for storing the bulk of the food contained in the feeder, and a trough for holding and distributing a smaller amount of food for immediate feeding. The entire apparatus is allowed to hang freely from a support such as a tree branch or limb, and may further include a cover or roof to protect the trough from rain, sleet and snow. The hopper may be of any shape, although block and cylindrical shapes are most common. Similarly, the trough may be variously shaped, and may further include a variety of means to control the distribution of food from the hopper to the trough, and from the trough to the birds. In addition, both the hopper and the trough may be constructed of a variety of materials as noted above. In particular, it has been known to use a common household jar as the hopper, and a surface attached thereto as a trough.

One problem encountered with feeders made from glass jars is how to suspend the jar from a support or tree in an inverted orientation. Because there is typically only one opening or mouth to a jar, the jar must be held in an inverted position during use so that seed flows easily out of the jar. However, the bottom of a jar is typically quite smooth, and because the glass is not readily cut or drilled, suspending means is not easily attached directly thereto. Further, the jar must be suspended so that it is quickly and easily returned to its upright position for refilling. A need therefore exists for a birdfeeder, or a kit for making the same, in which a glass jar can be suspended in an inverted position from a support, yet still be quickly returned to its upright orientation when necessary to refill. The present invention addresses this need.

SUMMARY OF THE INVENTION

An improved bird feeder, according to one embodiment of the present invention, comprises a jar to act as a hopper for storing birdseed, a trough for holding seed and to provide a perch for feeding, means for suspending the trough and attached jar from a support, and means for preventing the inverted and suspended jar from pivoting downward when the feeder is in use. The means for preventing the inverted and suspended jar from pivoting downward when the feeder is in use is slideably received on the suspending means, and is quickly and easily engaged or released.

One object of the present invention is to provide a bird feeding apparatus employing a common household jar as a seed hopper.

Another object of the present invention is to provide a bird feeder which is easily refillable, provides superior protection of the seed, and is easily maintained.

Another object of the present invention is to provide a bird feeder which is relatively inexpensive to construct, can be sold at a reasonable cost, and constitutes not only an efficient feeder but also presents an attractive appearance.

Related objects and advantages of the present invention will be apparent from the following description.

DESCRIPTION OF THE PREFERRED EMBODIMENT

Figure 2:
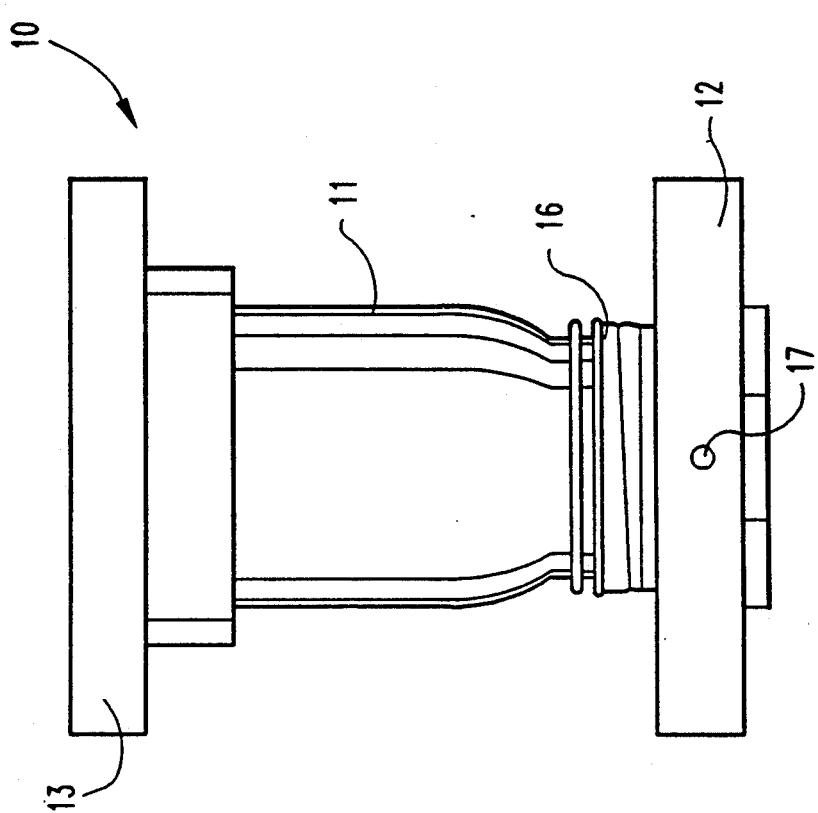
FIG. 2 is a side elevational view of the improved bird feeder of the present invention, according to a typical "single jar" embodiment.

For the purposes of promoting an understanding of the principles and operation of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to those skilled in the art to which the invention pertains.

Figure 1:
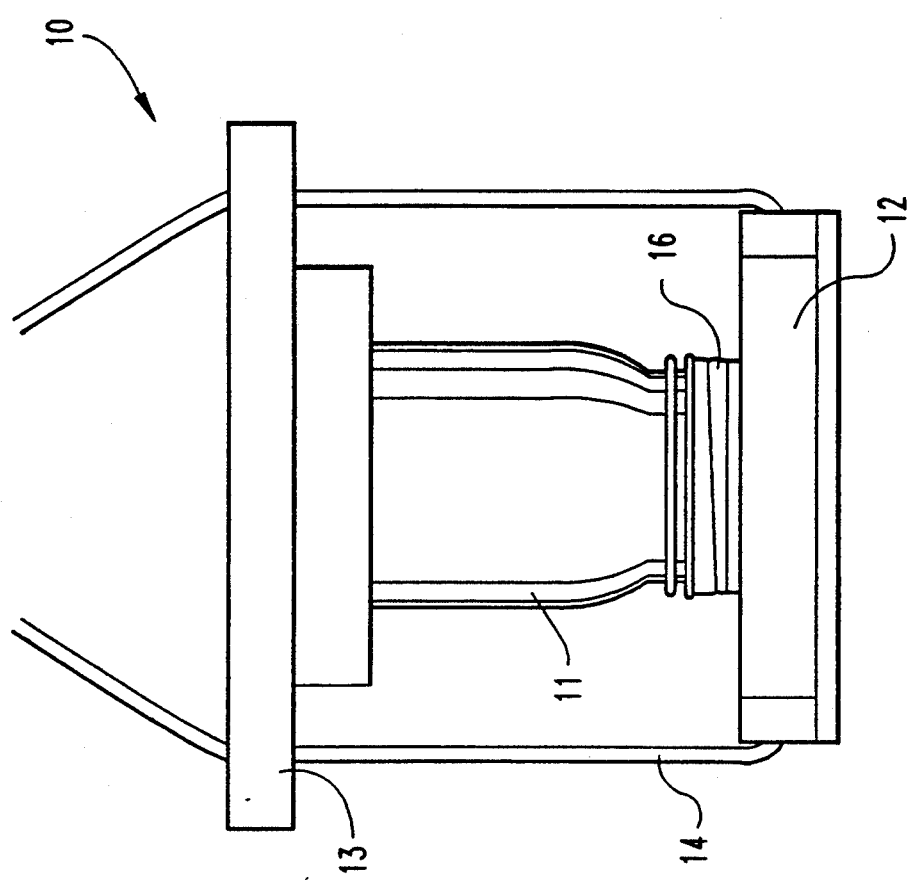
FIG. 1 is a front elevational view of the improved bird feeder of the present invention, according to a typical "single jar" embodiment.

Referring now to the drawings, FIGS. 1 and 2 show the basic components of the invention. Bird feeder 10 comprises a jar 11 to hold bird seed, a lower member 12 to hold the seed which is released from the jar, an upper member 13 to prevent the jar from pivoting downward when hung from a support, and a cord 14 to suspend the lower member. As will be seen in more detail in FIG. 3, the lower member includes the lid 16 of the jar, and further includes one or more holes 17 for attaching the cord.

Figure 3:
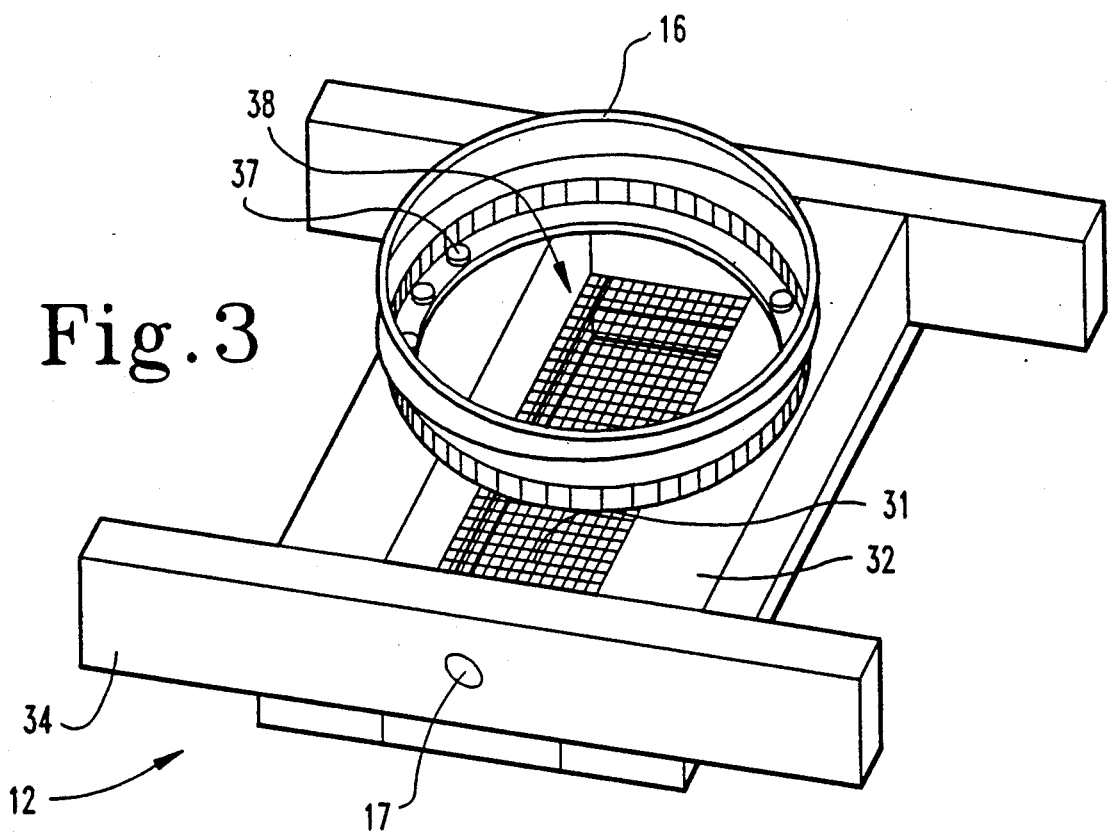
FIG. 3 is a perspective view of the lower member of the bird feeder, according to a typical embodiment of the present invention, showing the generally planar surface, the spacing means and the attached jar lid.

FIG. 3 shows the lower member of the feeder. Lower member 12 includes a generally planar surface 31, jar lid 16, and spacing means 32 for maintaining the jar lid and the generally planar surface in a spaced apart relation. The lower member may additionally include one or more frame members 34 to provide additional structural support. Jar lid 16 is fixedly attached to spacing means 32 with small tacks or nails 37. Means for attaching a cord are also preferably included, and may be as simple as a hole 17 through the spacing means or frame member.

In the preferred embodiment, generally planar surface 31 is rectangularly shaped, and provides the surface on which birdseed is held for feeding. Preferred spacing means 32 comprise two, low walls, rising above and located along the longer sides of planar surface 31. Optional frame members 34 are preferably two, low walls of similar height to spacing means 32, however the fame members are preferably located above and along the shorter sides of surface 31. Thus, spacing means 31 and frame members 34 preferably provide a rectangular frame, below which planar surface 31 is attached.

It can be seen that the space above planar surface 31 but between spacing means 32 is shaped as a trough, and that the additional frame members 34 further define the ends of that trough. This trough efficiently holds the birdseed which flows from the jar, and provides sufficient space for several birds to feed at once. Spacing means 32 and frame members 34 further provide a perch for birds while they are feeding.

Jar lid 16 is fixedly attached to spacing means 32, preferably with small nails 37 or tacks. Lid 16 includes an aperture 38 large enough to allow birdseed to pass freely therethrough, and is positioned so that the jar and lower member are in a "hopper and trough" relation.

Generally planar surface 31 is preferably made of fine mesh screen. This provides ample support for the seed, while still allowing efficient draining of the trough. It is desired to keep the trough free of liquid to prevent spoilage of the seed. Spacing means 32 and frame members 34 are preferably made of wood, although alternate materials can clearly be used.

Figure 4:
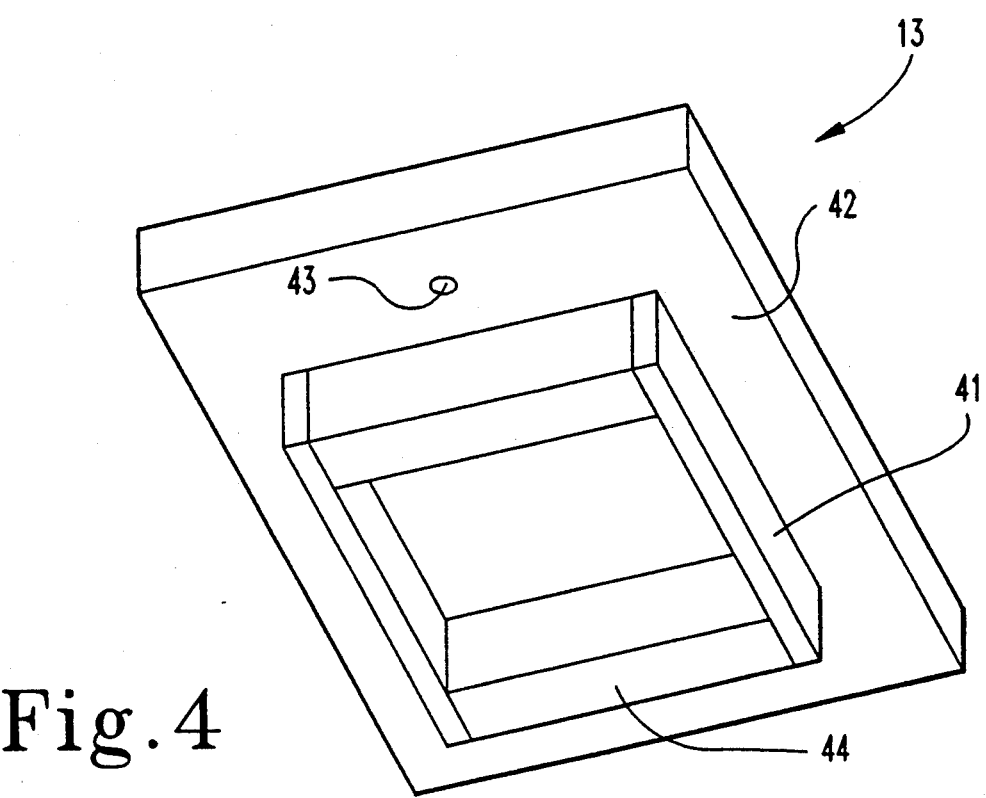
FIG. 4 is a perspective view of the upper member of the bird feeder, according to a typical embodiment of the present invention, showing the means for preventing the jar from pivoting downward when suspended from a support.

FIG. 4 shows the top member of the feeder. Top member 13 includes means 41 for preventing jar 11 from pivoting downward while attached to suspended lower member 12. Note that when the jar is inverted and positioned above the lower member, and the lower member is suspended by a cord, the center of mass of the feeder is higher than the point at which the cord is attached to the lower member. Accordingly, gravity acts to try and pivot the jar downward so that the jar hangs below the suspended lower member. Means 41 for preventing the jar from pivoting downward holds the jar in an upside-down orientation so that feed flows through the jar mouth into the trough.

In the preferred embodiment, means 41 comprises wooden walls which can be slideably engaged and disengaged from the jar. Thus, means 41 is quickly and easily engaged to hold the jar in its inverted orientation, but is similarly quickly and easily released to allow the jar to be returned to an upright position for refilling.

Upper member 13 may include a frame 42 onto which means 41 is attached. Further, holes 43 are preferably located in the upper member to allow it to be slideably received on cord 14 from which the lower member is suspended. Upper member 13 is preferably made of wood to provide both durability and an attractive appearance.

Figure 6:
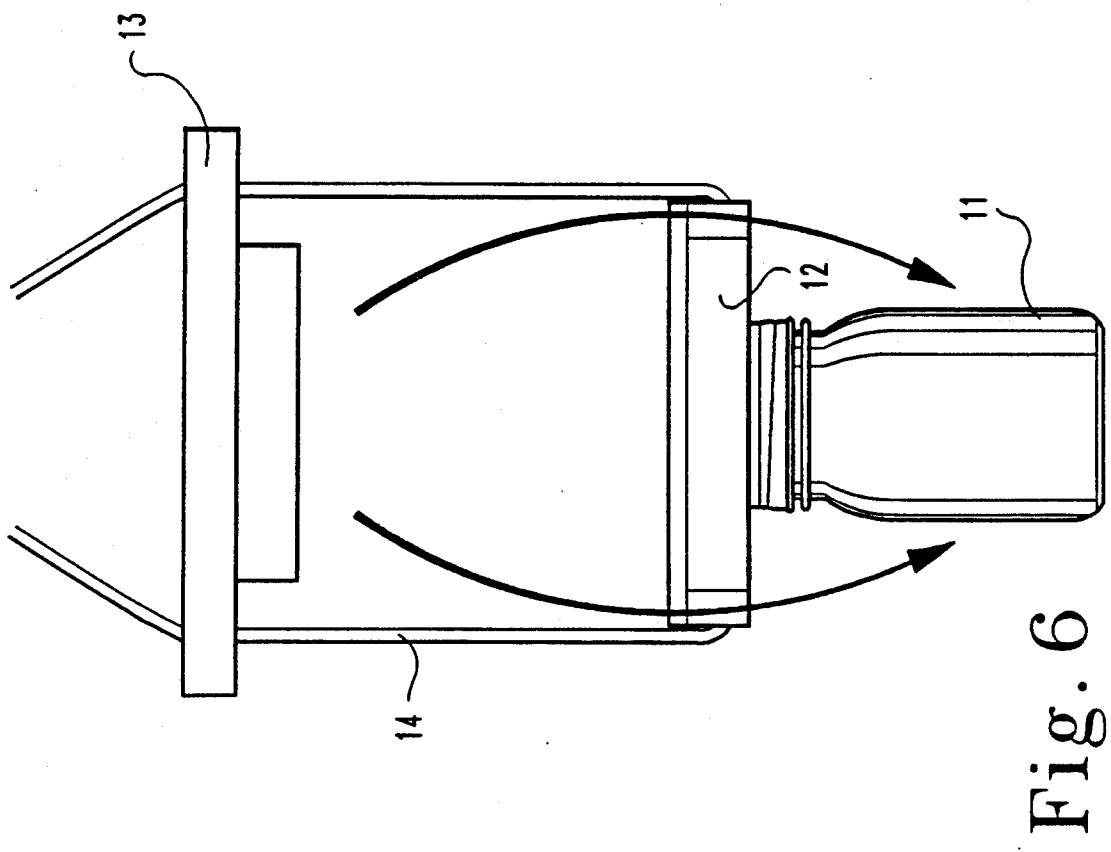
FIG. 6 is a front elevational view of the improved bird feeder, according to a typical embodiment of the present invention, showing the jar in its downward orientation
Figure 5:
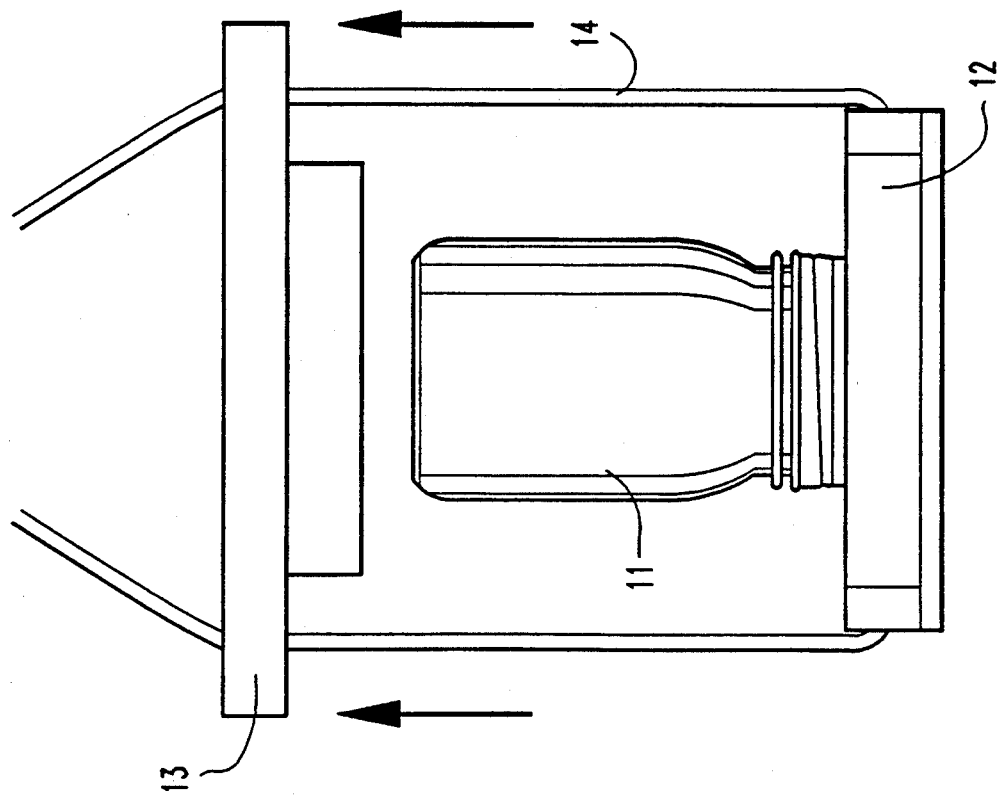
FIG. 5 is a front elevational view of the improved bird feeder, according to a typical embodiment of the present invention, showing the feeder when the upper member means for preventing the jar from pivoting downward has been disengaged, but the jar has not begun to pivot downward.

In operation, the feeder is suspended as shown in FIG. 1, with the jar positioned above the feeding surface of the lower member. When refilling is necessary, the upper member is slid up the cord until means 41 for preventing the jar from pivoting downward is disengaged. FIG. 5 shows the feeder with means 41 disengaged, but before jar 11 has been allowed to pivot downward. After means 41 is disengaged, the jar is allowed to pivot downward until it hangs below the lower member, as shown in FIG. 6. The jar can now be unscrewed from the lower member and refilled. When full, the jar is replaced and inverted, and means 41 is re-engaged to hold the jar in its inverted orientation.

The speed and ease with which the feeder can be refilled is one significant feature of the present invention. Further, the refilling process can be accomplished without removing the feeder from its suspending cord, or the cord from its support. Only the jar of the feeder is removed from the suspended apparatus, eliminating the need to juggle various components while refilling, and freeing one's hands to quickly place fresh seed in the jar.

It is to be appreciated that the birdfeeder of the present invention may utilize jars of practically any size, although pint, quart and a half-gallon sizes have been preferred. Regarding shape, jars of preferred embodiments are common, wide-mouthed, household "canning" jars. These jars have commonly been sold as "Mason" jars or "Ball" jars, and are inexpensive, durable and functional.

Figure 8:
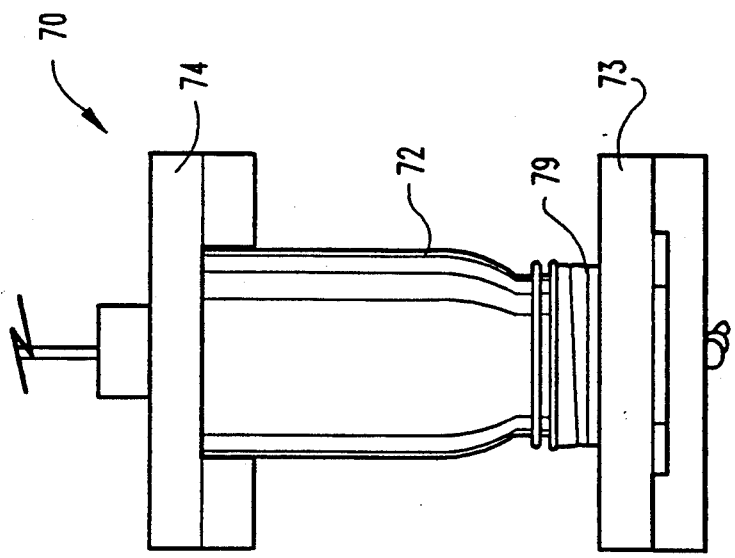
FIG. 8 is a side elevational view of the improved bird feeder of the present invention, according to a typical "double jar" embodiment.
Figure 7:
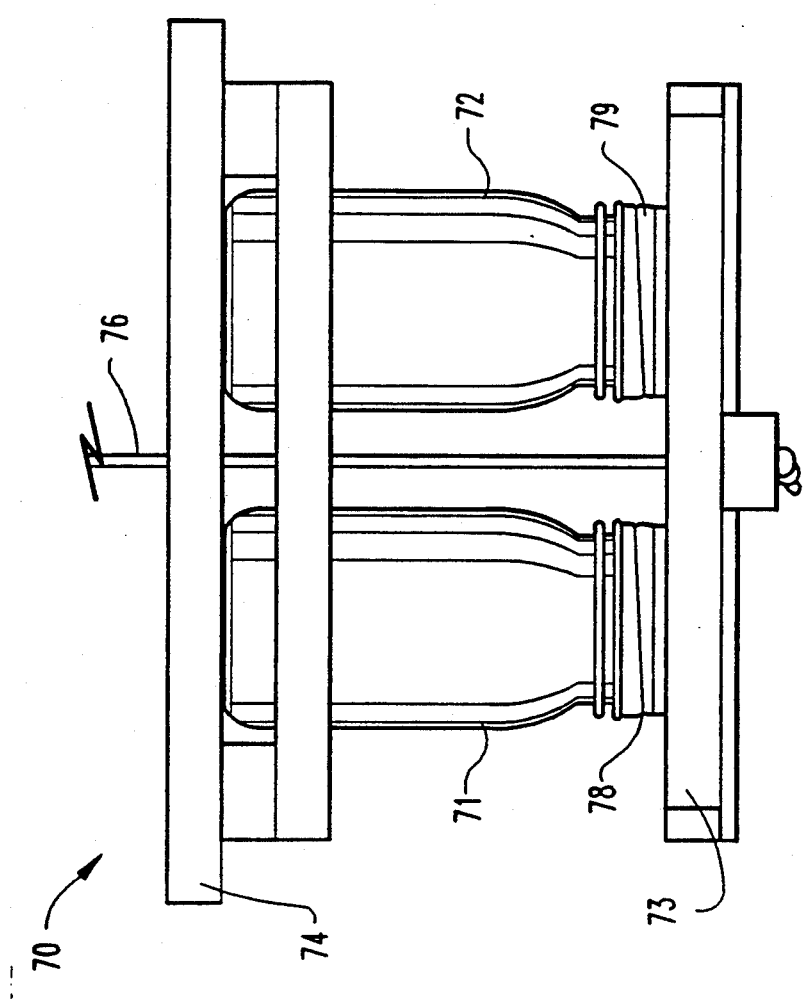
FIG. 7 is a front elevational view of the improved bird feeder of the present invention, according to a typical "double jar" embodiment.

Additionally, the bird feeder of the present invention may accommodate more that one jar at a time. FIGS. 7–10 show a "double jar" birdfeeder according to one preferred embodiment, the views shown being similar to those of FIGS. 1–4. FIGS. 7 and 8 therefore show the basic components of the double jar embodiment. Bird feeder 70 comprises two jars 71 and 72 to hold bird seed, a lower member 73 to hold the seed which is released from the jar, an upper member 74 to prevent the jars from pivoting downward as described above. Again, lower member 73 includes the lids 78 and 79 of the jars, and may further include one or more holes for attaching the cord.

Figure 9:
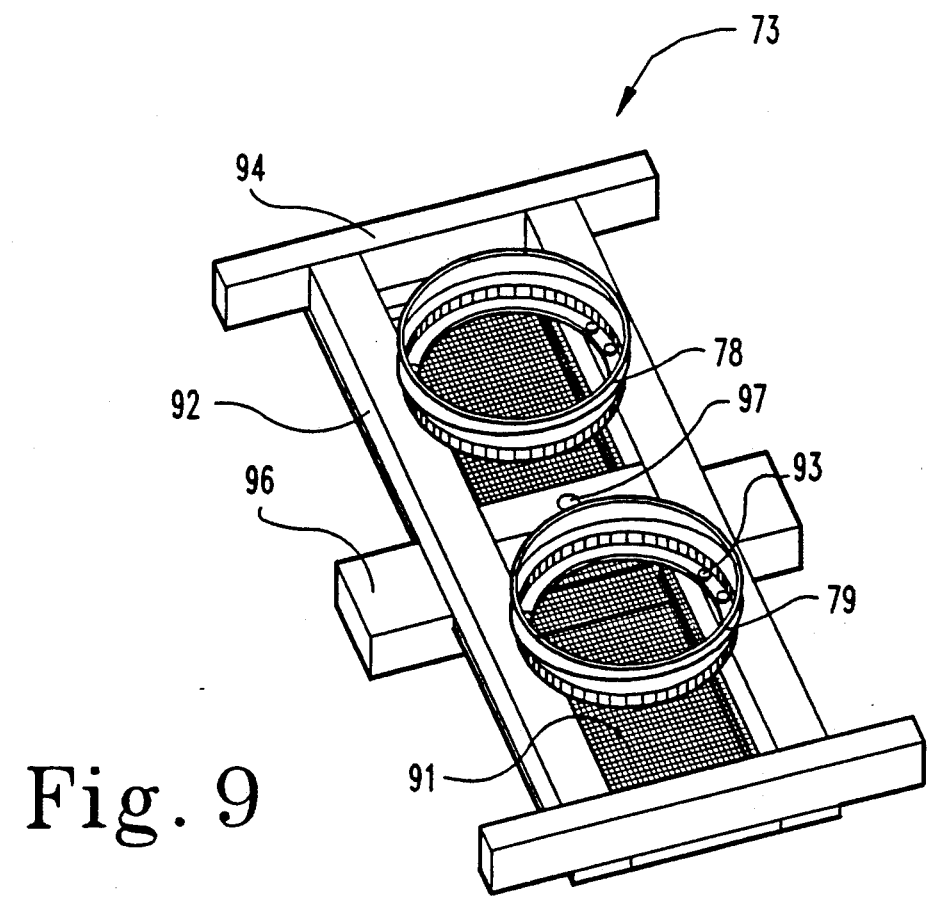
FIG. 9 is a perspective view of the lower member of the bird feeder, according to a typical "double jar" embodiment of the present invention, showing the generally planar surface, the spacing means and the attached jar lid.

FIG. 9 shows the lower member of the double jar feeder. Lower member 73 is quite similar to lower member 12 described above, and includes a generally planar surface 91, jar lids 78 and 79, and spacing means 92 for maintaining the jar lids and the generally planar surface in a spaced apart relation. The lower member may additionally include one or more frame members 94 to provide additional structural support. Jar lids 78 and 79 are again fixedly attached to spacing means 92 with small tacks or nails 93. Means for attaching a cord are also preferably included, and may be as simple as a hole 97 through the spacing means or frame member.

As was the case with the single jar feeder, in the preferred embodiment, generally planar surface 91 is rectangularly shaped, and provides the surface on which birdseed is held for feeding. Preferred spacing means 92 again comprise two, low walls, rising above and located along the longer sides of planar surface 91. Optional frame members 94 are again preferably two, low walls of similar height to spacing means 92, and again the fame members are preferably located above and along the shorter sides of surface 91. Spacing means 92 and frame members 94 therefore again provide a rectangular frame, below which planar surface 91 is attached.

The space above planar surface 91 but between spacing means 92 is again shaped as a trough, and additional frame members 94 again define the ends of that trough. This trough efficiently holds the birdseed which flows from the jar, and provides sufficient space for many birds to feed at once. Spacing means 92 and frame members 94 further provide a perch for birds while they are feeding.

Jar lids 78 and 79 again each include an aperture large enough to allow birdseed to pass freely therethrough, and are positioned so that the jars and lower member are in a "hopper and trough" relation. Generally planar surface 91 is again preferably made of screen to provide support for the seed and efficient draining of the trough. Spacing means 92 and frame members 94 are still preferably made of wood, for both functionality and appearance.

Figure 10:
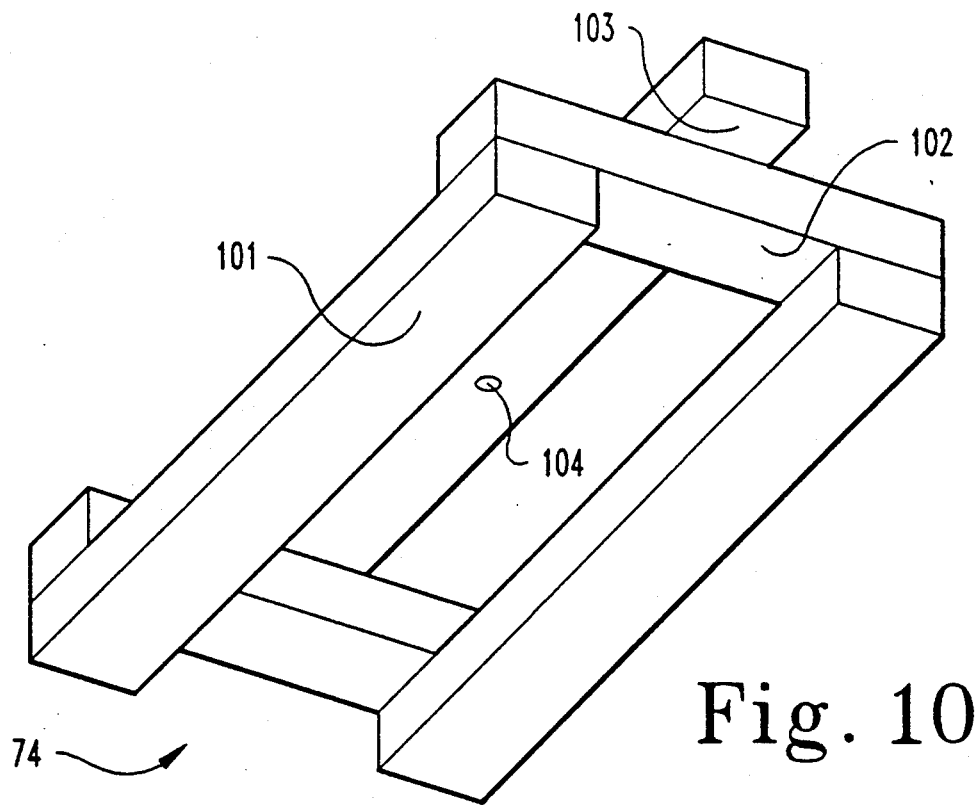
FIG. 10 is a perspective view of the upper member of the bird feeder, according to a typical "double jar" embodiment of the present invention, showing the means for preventing the jar from pivoting downward when suspended from a support.

FIG. 10 shows the top member of the double jar feeder. Top member 74 includes means 101 for preventing the jars from pivoting downward while attached to suspended lower member 73. In the preferred embodiment, means 101 again comprises wooden walls which can be slideably engaged and disengaged from the jar. Thus, means 101 is quickly and easily engaged to hold the jar in its inverted orientation, but is similarly quickly and easily released to allow the jar to be upright for refilling.

Upper member 74 may include a frame onto which means 101 is attached. In the preferred embodiment, the frame includes cross frame members 102 and horizontal frame member 103. Further, one or more holes 104 are preferably located in the upper member to allow it to be slideably received on cord 76 from which the lower member is suspended. Upper member 74 is again preferably made cf wood to provide both durability and an attractive appearance.

The double jar feeder operates as the single jar feeder, so that in operation the feeder is suspended as shown in FIG. 7, with the jar positioned above the feeding surface of the lower member. When refilling, the upper member is again slid up cord 76 until means 101 for preventing the jar from pivoting downward is disengaged. After means 101 is disengaged, the jars are allowed to pivot downward until they hangs below the lower member. They are subsequently unscrewed and refilled as before. When full, the jars are replaced and inverted, and means 101 is re-engaged to hold the jar in its inverted orientation.

Obviously, a large number of cosmetic changes may be made to adapt the bird feeder to a particular need without changing the basic design. Therefore, while the invention has been illustrated and described in detail in the foregoing drawings and descriptions, the same are to be considered illustrative and not restrictive in character. It is to be understood that the preferred embodiment has been shown and described, and that all changes and modifications that come within the spirit of the invention are desired to be protected. For example, the present invention may be adapted to any use wherein a reservoir is to be hung upside down while in use, but is to be quickly and easily "flipped" to its upright position for refilling or replacement.

I claim:

1. A bird feeder, comprising:
    (a) a jar for holding bird seed, said jar having a mouth;
    (b) a trough;
    (c) means for positioning the mouth of said jar directly over said trough so that seed may flow from the jar into the trough;
    (d) means for directly suspending said trough from a support;
    (e) means for holding said jar in a generally mouth-downward orientation when the jar is positioned over said trough suspended by said suspending means, wherein said holding means is slideably received on said suspending means.

2. A bird feeder, comprising:
    (a) a glass jar for holding bird seed, said jar having a mouth;
    (b) a lower member, comprising:
        (i) a generally planar surface, effective to hold bird seed deposited thereon;
        (ii) a lid, sized to sealingly fit the mouth of said jar and having an aperture passing therethrough;
        (iii) spacing means for maintaining said jar lid and said generally planar surface in a spaced-apart relation effective to allow seed to flow from the glass jar onto the generally planar surface, said spacing means being fixedly attached to the generally planar surfaces
        (iv) means for attaching the jar lid to said spacing means;
    (c) means for suspending said lower member;
    (d) means for holding said jar in a generally mouth-downward orientation when the jar is attached to said lower member suspended by said suspending means, wherein said holding means is slideably received on said suspending means.

3. A bird feeder, comprising:
    (a) a glass jar, effective as a reservoir for bird seed, said jar including:
        (i) a mouth, threaded to receive a screw-on lid; and
        (ii) a lid threaded to fit said mouth, wherein said lid includes an aperture to allow bird seed to pass therethrough while the lid is screwed onto the jar;
    (b) a lower member, comprising:
        (i) a generally planar surface, effective to hold bird seed deposited thereon;
        (ii) spacing means for maintaining said jar lid in a fixed position the proper distance and at the proper orientation to effectively deposit seed from the glass jar onto the generally planar surface;
        (iii) means for fixedly attaching the jar lid to said spacing means so that the top of the lid contacts said spacing means, while the threads of the lid are positioned to receive the jar; and (iv) means for attaching a flexible cord to said lower member;

(c) a flexible cord, attached to said lower member, and capable of suspending the operable bird feeder from an overhead support;

(d) an upper member, comprising: (i) a frame, having one or more holes therethrough, slideably received on said flexible cord; and (ii) means for restraining said jar in a generally mouth-downward orientation when the jar is attached to said lower member suspended by the flexible cord.

4. A kit for making a bird feeder from a common "Mason" jar, comprising:

(a) a first member, comprising;

(i) a generally planar surface, effective to hold bird seed deposited thereon;

(ii) a lid, sized to sealingly fit the mouth of said jar and having an aperture passing therethrough;

(iii) spacing means for maintaining said jar lid and said generally planar surface in a spaced-apart relation effective to allow seed to flow from the glass jar onto the generally planar surface, said spacing means being fixedly attached to the generally planar surfaces (iv) means for attaching the jar lid to said spacing means; and (b) a second member, comprising:

(i) a frame, having one or more holes therethrough, slideably received on said flexible cord; and (ii) means for restraining said jar in a generally mouth-downward orientation when the jar is attached to said lower member suspended by the flexible cord.

* * * * *